United States Patent [19]

Taylor

[11] 4,357,520
[45] Nov. 2, 1982

[54] ELECTRIC WATER-BOILING CONTAINER HAVING SWITCH-ON DRY AND STREAM SENSITIVE THERMALLY RESPONSIVE CONTROL UNITS

[76] Inventor: John C. Taylor, 9 Homefield Park, Ballasalla, Castletown, Isle of Man

[21] Appl. No.: 131,482

[22] Filed: Mar. 18, 1980

[30] Foreign Application Priority Data

Mar. 23, 1980 [GB] United Kingdom ............... 7910288

[51] Int. Cl.³ .................. H05B 1/02; H01H 37/04; A47J 27/62
[52] U.S. Cl. ................................ 219/330; 99/281; 219/311; 219/322; 219/337; 219/436; 219/441; 219/512; 337/380
[58] Field of Search ............... 219/328, 331, 436–438, 219/441, 442, 335, 336, 337, 311, 322, 512; 337/380; 99/281

[56] References Cited

U.S. PATENT DOCUMENTS

| 1,794,045 | 2/1931 | Warner | 219/441 |
| 2,900,895 | 8/1959 | Schwaneke et al. | 99/281 X |

FOREIGN PATENT DOCUMENTS

| 892685 | 3/1962 | United Kingdom | 219/437 |
| 982553 | 2/1965 | United Kingdom | 219/441 |
| 1041705 | 9/1966 | United Kingdom | 219/442 |
| 1064643 | 4/1967 | United Kingdom | 219/437 |
| 1274552 | 5/1972 | United Kingdom | 219/437 |
| 1316436 | 5/1973 | United Kingdom | 219/437 |
| 1470366 | 5/1974 | United Kingdom | 219/437 |
| 1401954 | 8/1975 | United Kingdom | 219/437 |
| 1470367 | 4/1977 | United Kingdom | 219/437 |

Primary Examiner—A. Bartis
Attorney, Agent, or Firm—Bacon & Thomas

[57] ABSTRACT

An electrically heated container for boiling liquids is provided with a thermally sensitive electrical control including a switch-on-dry protector switch unit directly connected with the cold leads of an electric heating element located externally of the container and in contact with the bottom wall thereof. The protector switch unit includes a thermally sensitive switch means enclosed in a protective housing having projecting terminal pins engageable by a female socket connector. The protector switch unit is mounted on a thermally conductive mounting plate located externally of the container and in contact with the heating element. The plate is enclosed by a detachable base member on the container. A steam-sensitive switch unit is mounted on the protector switch unit and includes a thermally sensitive element arranged to be impinged by steam produced by liquid boiling in the container and mechanically coupled to the switch means of the protector switch unit for deenergizing the heating element.

5 Claims, 7 Drawing Figures

ELECTRIC WATER-BOILING CONTAINER HAVING SWITCH-ON DRY AND STREAM SENSITIVE THERMALLY RESPONSIVE CONTROL UNITS

SUMMARY OF THE INVENTION

This invention relates to electrically-heated water boiling containers such as urns, jugs, pans or the like having integral electric heaters of the kind comprising sheathed heating elements terminating in cold leads whereby electrical connections are made to the heater and wherein the heaters are mounted externally of the container with the heating elements thereof in good thermal contact with a containing wall of the container e.g. as being brazed to the underside of the bottom of the container. Such containers will hereinafter be termed containers of the kind referred to.

In containers of the kind referred to it is necessary to provide electrical protection for the heater in the event that the container is switched on empty or boils dry. In a typical arrangement wherein the heater element is brazed to the underside of the bottom of an electrically-heated hot water jug, there is also mounted on the underside of the bottom of the jug a thermally-sensitive switch unit including a bimetallic disc switch actuator which will operate should the heater overheat to interrupt the electrical supply to the heater. Also mounted on a base of the jug is a male pin connector unit adapted to receive a female socket for connecting the jug to a mains supply. Individual wired connections are provided between the male pin unit, the switch unit and the cold leads of the heating element whereby the switch unit is connected in series with the line pin of the pin unit and the heater element. Such a collection of components separately mounted and electrically interconnected is extravagant both in terms of parts used and time spent in their assembly.

It is well-known to fit electric kettles with electric immersion heaters (hereinafter termed electric immersion heaters of the first kind described) which comprise a heating element carried by a head which is adapted to be secured in a water-tight manner in or adjacent an opening in the kettle wall. It is likewise well-known for said head to mount externally of said kettle a thermally-sensitive electrical control (hereinafter termed a thermally-sensitive electrical control of the first kind described) in the form of a switch-on-dry protector switch unit which makes electrical connection with said cold leads and includes thermally-sensitive switch means effective to interrupt the electrical supply to the heater should the element over heat through being switched on dry and terminal pins adapted to be engaged by a female socket connector whereby electric connection of the heater to a mains supply can be made. Switch-on-dry protector switch units per se are well known and are described in, for example, British Patent Specification Nos. 1,401,954 and 1,064,643.

According to the present invention a container of the kind referred to is provided with a thermally sensitive electrical control including a switch-on-dry protector switch unit making direct electrical connection with the cold leads of the heating element and including thermally-sensitive switch means effective, in use, to interrupt the electrical supply to the heater and terminal pins adapted to be engaged by a female socket connector whereby electric connection of the heater to a mains supply can be made, said unit being mounted on a mounting plate itself mounted on said container in direct or indirect thermal contact with said heater element whereby said plate conducts heat to said switch unit to cause said switch means to operate should the element overheat through being switched on dry or boiled dry.

There can thus be achieved according to the present invention a substantial simplification and saving in parts and labour by the use of a readily available kettle control in place of separate switch and connector units. With kettle immersion heaters the rise in temperature of the heater element is very rapid if switched-on-dry and there is therefore a need to sense quickly and as directly as possible the temperature of the heating element. To this end a heated portion of the element (hot return) is usually brazed to the heater head directly opposite to the thermally-responsive actuator of the control. Even so the prevention of damaging overheating on the one hand and the avoidence of nuisance tripping of the control on the other results in quite critical conditions for a successful control. Such critical conditions do not however arise where the heater is externally mounted and in good thermal contact with the container since the container itself acts as a heat sink and it has been found that an immersion heater control will function entirely satisfactorily if mounted on a plate itself mounted on the container adjacent the heater element or preferably on a heated portion of the element itself so that heat to operate the control is conducted along the plate rather than directly through it as with the head of an immersion heater where as previously described a hot return of the heater element is directly brazed to the heater head.

It is additionally quite usual to provide water boiling containers such as kettles fitted with an internal heater i.e. an immersion heater with a boiling control i.e. a control effective to interrupt the electrical supply to the heater upon the water in the container boiling. Thus electric immersion heaters (hereinafter termed electric immersion heaters of the second kind described) of the first kind described are also known which additionally carry a tube for egress of vapour or steam from the interior of the container via the head of the heater, the tube being arranged, in use, so as to extend above the water level in the container. In this case the head mounts a thermally-sensitive electrical control (hereinafter termed a thermally-sensitive electrical control of the second kind described) of the first kind described which is additionally effective to interrupt the electrical supply to the heater in response to vapour or steam issuing from said tube upon the water in the container boiling. Such a thermally-sensitive electrical control of the second kind described together with an electric immersion heater of the second kind described is disclosed in British Patent Specification No. 1,316,436.

More generally it is known from British Patent Specification No. 1,274,552 to provide a steam or vapour tube or passage either within or along an outer surface of a water boiling container for the flow of vapour or steam from within the container to an outlet in or adjacent the container floor for the purpose of controlling a thermally-sensitive electrical control associated with an electric heater which heater may or may not be integral with the container.

Specifically described in Specification No. 1,274,552 is an immersion heater of the first kind described in association with a thermally-sensitive electrical control which as with that described in Specification 1,316,436 comprises two switch units namely a dry-switch-on protector unit and a steam or vapour sensitive unit mounted one on the other.

Again it is known to provide water boiling containers such as kettles with a boiling control which includes a thermally responsive switch actuator disposed in close proximity to a steam or venting aperture in the upper part of the container wall and to provide a mechanical linkage between said actuator and either the switch of a thermally sensitive electrical control of the first kind described or of a steam sensitive switch unit associated with said electrical control and connected in series with said control switch. An arrangement of this general nature is described in British Patent Specification No. 1,470,367.

The above boiling controls are generally applicable to the present invention in that they employ a thermally sensitive electric control comprising two units namely a dry-switch-on protector unit and a steam or vapour sensitive unit mounted one on the other. Such a control can therefore be mounted on the mounting plate and the conduction of steam or vapour thereto or the provision of a suitable mechanical linkage to a remotely situated steam or vapour responsive actuator achieved in the general manner disclosed in the aforesaid Specifications.

Thus preferably and in general terms a container according to the invention has a control which further includes a steam sensitive unit mounted on said dry-switch-on protector unit, means being provided to actuate said steam sensitive unit in response to steam or vapour produced by water boiling within said container.

In a preferred construction the steam sensitive unit includes an over-centre spring mechanism and a thermally-responsive actuator for said mechanism, the control being adapted for the impingement on said actuator of said steam-sensitive unit of vapour or steam issuing from the outlet of a tube or passage leading to the interior of said container, a mechanical link being provided between said over-centre spring mechanism and the switch means of said protector switch unit so that on said over-centre spring mechanism being tripped by said actuator, said link serves mechanically to operate said switch means of the protector switch unit.

Steam or vapour may be led to the control via a steam tube exiting from said container, which tube may engage the protector switch unit in like manner as with electric immersion heaters of the second kind described. Alternatively a steam tube or passage, which communicates with a steam or vapour aperture in the upper wall of the container, may be run down the outside of the container. Such a tube or passage may be concealed within or behind a handle structure of the container.

There will now be described with reference to the accompanying drawings a preferred form of water-boiling jug according to the invention.

DETAILED DESCRIPTION OF THE INVENTION

Figure 1:
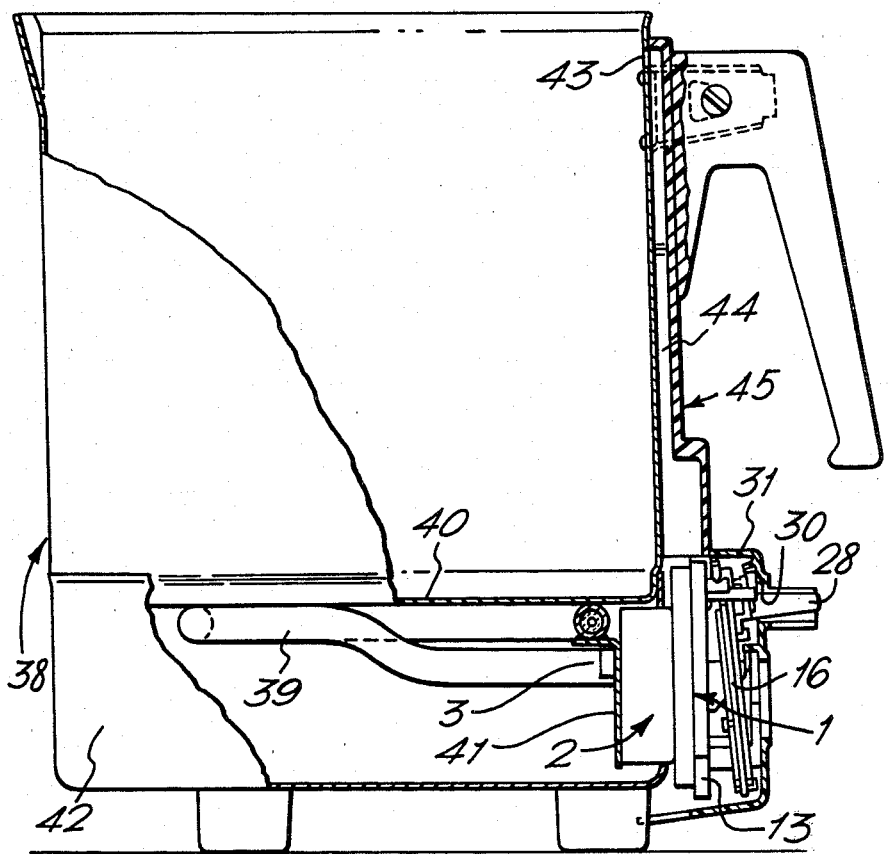
FIG. 1 is a side elevation partially in section of the water-boiling jug according to the invention.

As shown in FIG. 1 of the drawings, the thermally-sensitive electrical control 1,2 is fitted to a jug 38 having an electrical heater 39 brazed to the underside of the bottom 40 of the jug. The control 1,2 is mounted on a bracket 41 brazed to a heated portion of the heater element, the bracket being provided in like manner as the head of an immersion heater with a mounting stud whereby the control is mounted thereto. A detachable base 42 of the jug encloses the heater 39, an opening in the side of the base 42 being provided to receive the control 1,2. A lid (not shown) is provided for the jug 38 and a steam or vapour venting aperture 43 is provided at the top of the side wall. This aperture 43 communicates with a passage 44 defined between a handle structure 45 and the jug wall. The passage 44 leads directly to the control 1,2 so that when water boils in the jug and the lid is in place steam or water vapour is directed to the control 1,2.

Figure 2:
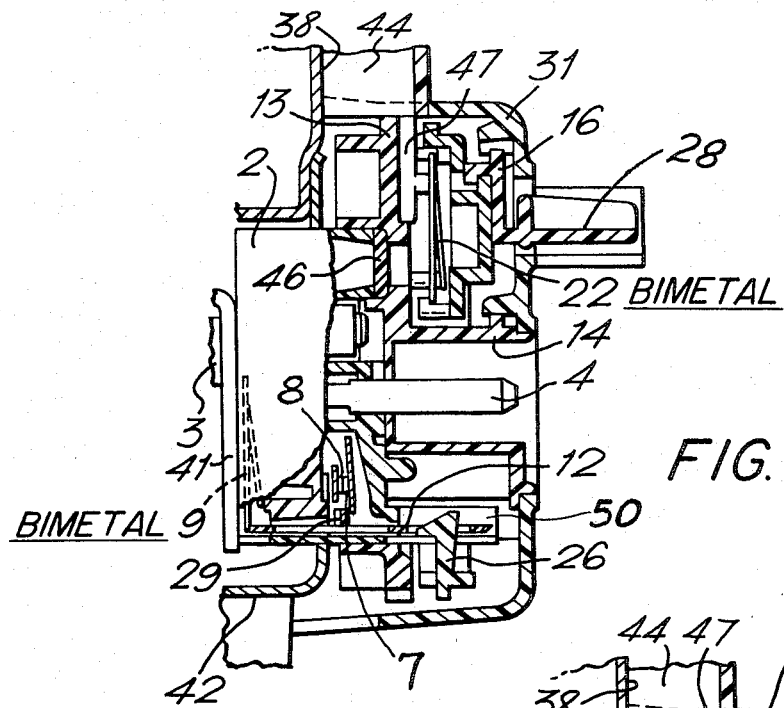
FIGS. 2 and 3 are side elevations in cross-section of the control as fitted in the jug.
Figure 3:
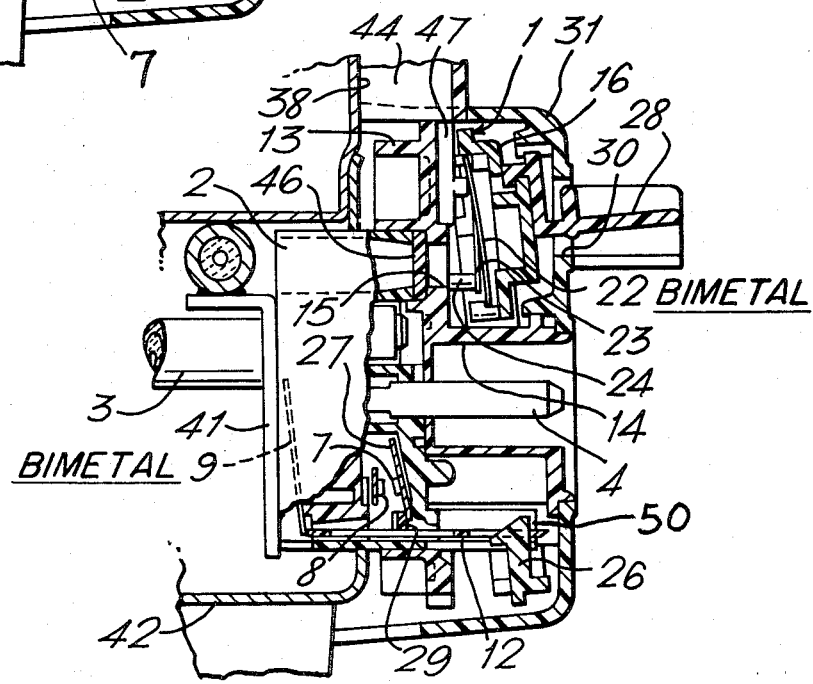

Referring additionally to FIGS. 2 to 6 the thermally-sensitive electrical control comprises a switch-on-dry protector switch unit 2, which includes a thermally sensitive actuator 9 and switch means operated thereby enclosed in a protective housing, mounted on the bracket 41 and a steam-sensitive unit 1 which is in turn mounted on the switch unit 2. The switch unit 2 is provided with three pins 4, including a line pin, a neutral pin and an earth pin, for connection to a female socket to supply mains electrical power to the heating element. The line pin is connected to one of the cold leads 3, which extend through the bracket 41, via a pair of electrical contacts including a movable contact 7 mounted on a resilient conductive strip 27 and a stationary contact 8 (FIGS. 2 and 3). When the contacts are separated, the supply of electrical current to the heating element is cut off. A bimetallic actuator 9 of the type disclosed in British Patent Specification No. 1,542,252 is provided in the protector switch unit, the tongue of the actuator being riveted to a pillar of the unit, and the main body of the actuator being in thermal contact with the bracket 41 in the "cold" position of the actuator. A mechanical link in the form of an elongate member 12 is mounted in the protector switch unit 2 so as to be slidable in its axial direction, the member 12 including an upwardly extending stop 29 adapted to engage the lower end of the resilient strip 27. Thus, when the jug is switched on dry, that is without any water in the jug, so that the temperature of the element rises above its normal working temperature, the actuator 9 is heated above its operating temperature by conduction of heat through bracket 41 and actuator 9 reverses its curvature with a snap action, moving the member 12 rightwardly as shown in FIGS. 2 and 3, thereby moving the movable contact 7 away from the fixed contact 8.

The steam-sensitive unit 1 includes a body member 13 which seats over the switch unit 2. The body member 13 has apertures therethrough for the pins 4 and includes a shroud 14 which surrounds the pins and guides a female socket in use. An aperture 15 is provided through the body member 13 capable of receiving a steam tube leading from the interior of the jug but in this case is blocked off by a plug 46. A lever member 16 of unit 1 is pivotably mounted on the body member 13 by means of two knife edges 17 formed integrally with the member 16 resting in notches 18 formed integrally with the member 13. Two over-centre C-springs 19 extend between notches formed in the lever member and body member respectively and bias the knife edges 17 into engagement with the notches 18. The lever member 16 is pivotable between a first position in which two stops 25 provided on the lever member 16 are in contact with the face of the body member 13 and a second position (as shown in the drawings) in which two portions 20 of the member 16 come into contact with two pillars 21 formed on the shroud 14. The stops 25 are provided on the lever member in the proximity of the notches on the lever member for the two C-springs 19. Thus, a certain degree of warping or inaccurate formation of the lever member 16 does not affect the operation of the over-centre mechanism in view of the fact that any change in the distance between the knife edges 17 and the stops 25 owing to warping of the lever member is taken up by a similar change in the distance between the notch for the C-spring and the knife edge fulcrum. In passing from one to the other position, the lever passes through an unstable dead centre position in which the two ends of each of the C-springs and the knife edge pivots are all in a common plane.

A bimetallic actuator 22 similar to the actuator 9 is mounted by means of the rim of its domed area on the lever member 16. The actuator is orientated so that its tongue 23 bears against a pillar 24 formed on the body member 13 in its "hot" position. When the water in the jug boils, steam or vapour issues from the aperture 43 passes along passage 44 and impinges on the actuator 22 as described hereinafter. The actuator then reverses its curvature with a snap action, so that its tongue 23 bears against the pillar 24, thus moving the lever member 16 from its first (FIG. 2) to its second position (FIG. 3). A portion 26 of the lever 16 extends through an aperture in the elongate member 12. Thus, when the lever moves from its first to its second position, the portion 26 of the lever engages the member 12 and slides it rightwardly as shown in FIGS. 2 and 3, thereby separating the contacts 7,8 as described above. The effect is that when the water boils, the lever 16 is tripped by the actuator 22 from its first to its second position, thus interrupting the supply of electricity to the heating element. When the actuator 9 of the protector switch unit separates the contacts 7,8, the movement of the member 12 also trips the lever 16 so that it moves from its first to its second position thus retaining the contacts in their separated position (see FIG. 3).

A knob 28 is mounted on the lever member 16 and extends through an aperture 30 in a housing 31 surrounding the thermally-sensitive control, for manually resetting the control. When the knob 28 is pressed downwardly, the lever member 16 is returned to its first position, thus allowing the resilient strip 27 to move the movable contact 7 into electrical contact with the fixed contact 8. The supply of current to the heating element can then be resumed. At the same time, the resilient strip 27 shifts the member 12 in the leftward direction as shown in FIGS. 2 and 3.

As shown in FIGS. 3 to 6 the upper part of the body member 13 is adapted to provide a steam or vapour channel 47 open upwardly to communicate with passage 44 and laterally to direct steam or vapour toward actuator 22.

Plug 46 prevents passage of steam or vapour into the dry-switch-on protector unit 2 and pins 4 are shielded from the steam issuing from the channel 47 by the shroud of the steam-sensitive unit 1, a mechanical link being provided between the over-centre mechanism and the switch means of the protector switch unit.

Figure 4:
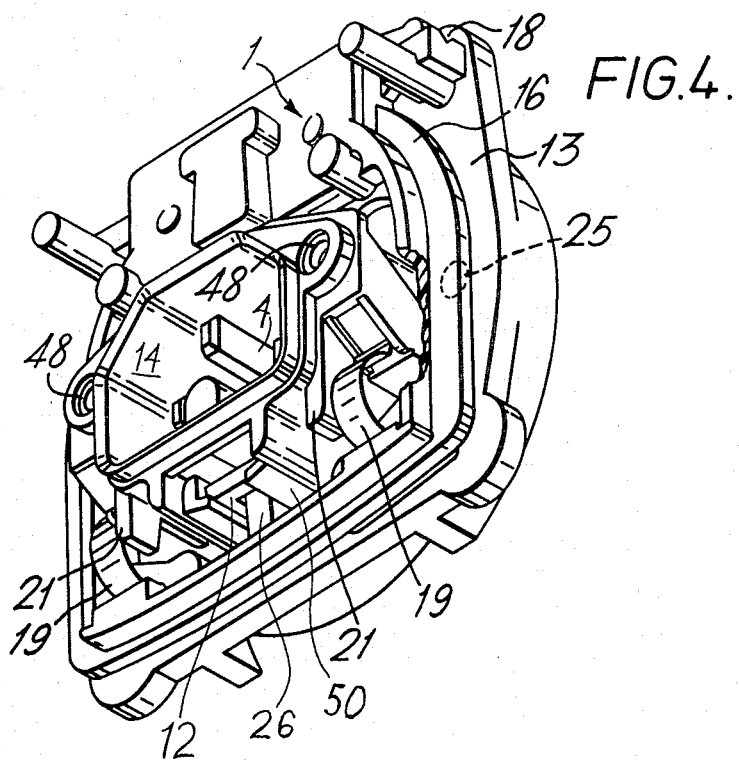
FIG. 4 is a perspective view from below and to one side of the control itself without its outer housing.
Figure 4A:
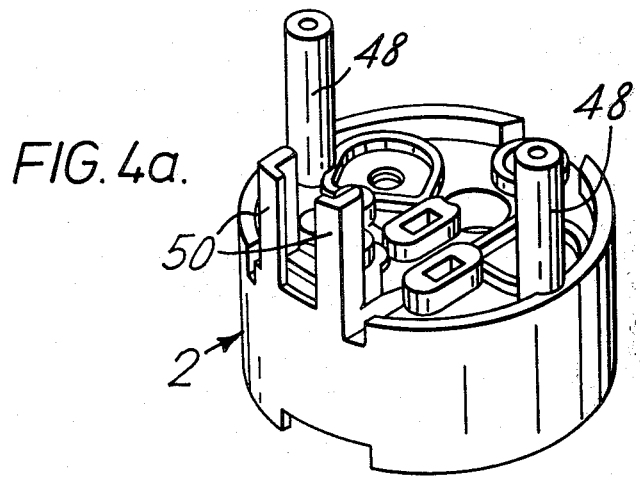
FIG. 4a is a perspective view of the body moulding of the switch-on-dry protector unit of the control.
Figure 5:
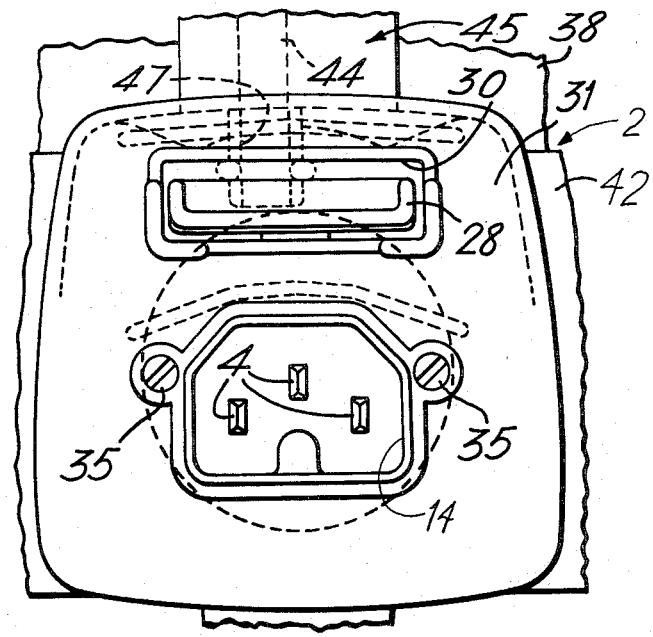
FIGS. 5 and 6 are front elevations of the control respectively with and without an outer housing in place.
Figure 6:
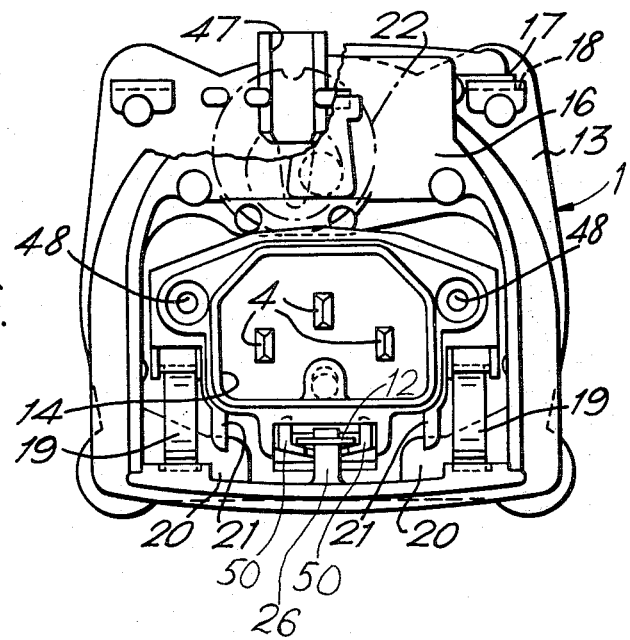

Housing 31 is secured to the unit 2 by screws 35 which engage internally threaded pillars 48 on the unit 2 (FIG. 4a), these pillars extending through apertures in body member 13, thus securing steam-sensitive unit 1 on unit 2. FIG. 4a also shows clearly the integral protective guides 50 for the link member 12.

I claim:

1. An electrically heated container for boiling liquids provided with a thermally sensitive electrical control including a switch-on-dry protector switch unit enclosed in a protective housing and making direct electrical connection with the cold leads of an electric heating element located externally on said container in heat exchange relation thereto and including thermally sensitive switch means effective, in use, to interrupt the electrical supply to said heating element; terminal pins carried by and projecting from said protective housing of said protector switch unit and adapted to be engaged by a female socket connector whereby electrical connection of said heating element to a main supply can be made, said protector switch unit being mounted on a mounting plate, said mounting plate being located within a detachable base member and externally of said container in thermal contact with said heating element; said mounting plate conducting heat to said switch unit to cause said switch means to operate and interrupt said electrical supply to said heating element should the element overheat when the container is switched on dry, said switch means also operating should the element overheat when the container is boiled dry.

2. A container as claimed in claim 1, wherein the control further includes a steam-sensitive unit mounted on said switch-on-dry protector switch unit, said steam-sensitive unit including means operatively coupled to the switch means of said switch-on-dry protector switch unit for operating said switch means to interrupt the electrical supply to said heating element in response to steam produced by liquid boiling within said container.

3. A container as claimed in claim 2, wherein the steam-sensitive unit includes an over-centre spring mechanism and a thermally-responsive actuator for said mechanism, the control being adapted for the impingement on said actuator of said steam-sensitive unit of steam issuing from the outlet of a passage leading to the interior of said container, a mechanical link being provided between said over-centre spring mechanism and the switch means of said protector switch unit so that on said over-centre spring mechanism being tripped by said actuator, said link serves mechanically to operate said switch means of the protector switch unit.

4. A container as claimed in claim 3, wherein said steam passage communicates with a steam aperture in an upper wall of the container and extends down the outside of the container.

5. A container as claimed in claim 4, wherein said passage is concealed by a handle structure of the container.

* * * * *

UNITED STATES PATENT AND TRADEMARK OFFICE
CERTIFICATE OF CORRECTION

PATENT NO. : 4,357,520
DATED : November 2, 1982
INVENTOR(S) : John C. Taylor

It is certified that error appears in the above—identified patent and that said Letters Patent is hereby corrected as shown below:

The word in the title reading "Stream" should read --Steam--.

Signed and Sealed this

Twenty-second Day of March 1983

[SEAL]

Attest:

GERALD J. MOSSINGHOFF

Attesting Officer

Commissioner of Patents and Trademarks